May 10, 1949.  V. P. SCHNEIDER  2,469,791
ATTACHMENT FOR WINDSHIELD WIPERS
Filed May 17, 1946
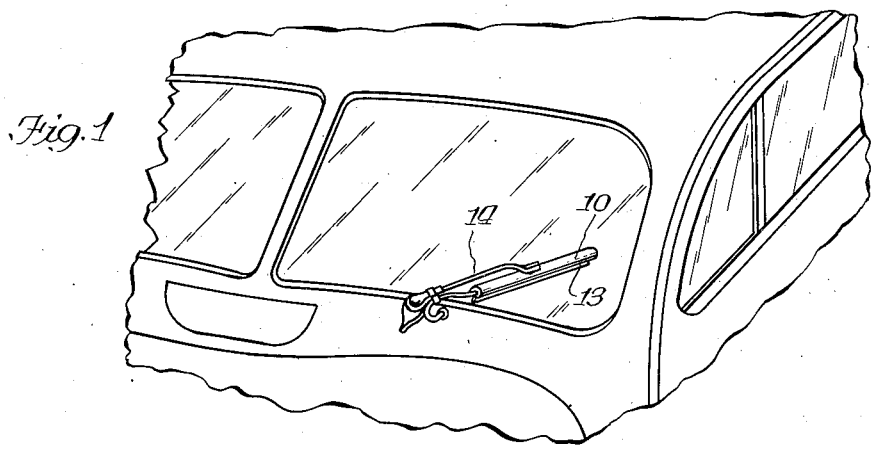
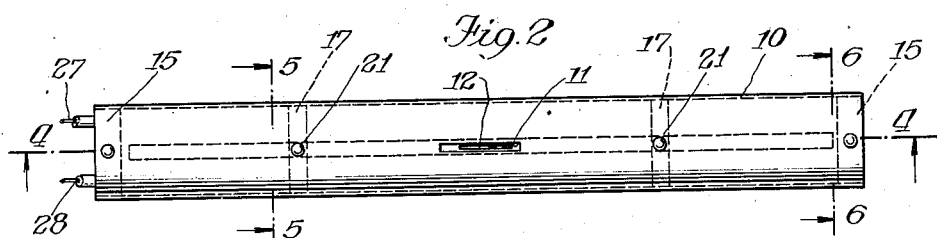
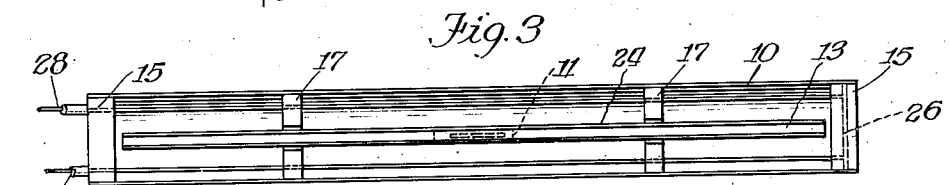
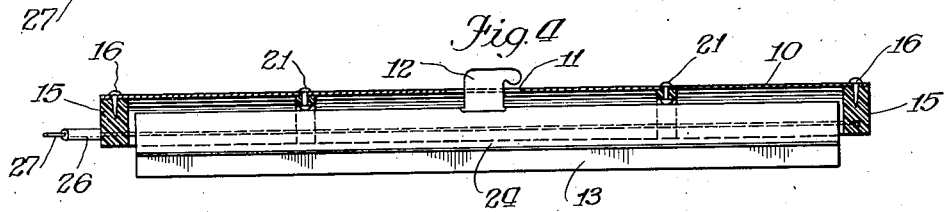
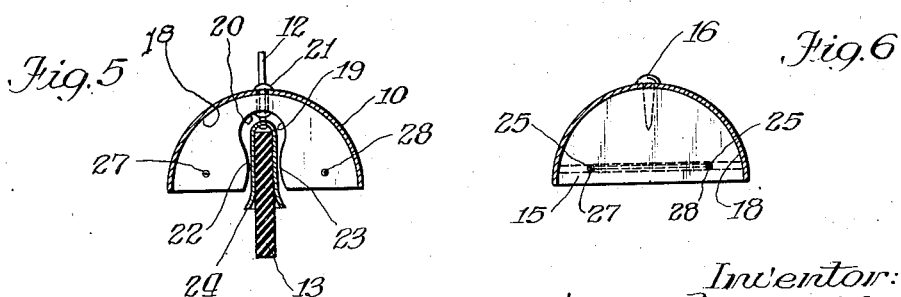
Inventor:
Victor P. Schneider
By: Archibald D. McKellar
Attorney.

Patented May 10, 1949

2,469,791

UNITED STATES PATENT OFFICE 2,469,791

ATTACHMENT FOR WINDSHIELD WIPERS

Victor P. Schneider, Green Bay, Wis.

Application May 17, 1946, Serial No. 670,627

3 Claims. (Cl. 219—19)

The invention relates to improvements in windshield wipers but more particularly to improvements in attachments adapted to increase the effectiveness of windshield wiper blades by removing sleet, snow or frost so that the blade may pass freely over its path on the windshield; and has for its objects the provision of such a device which will be simple of construction, economical to operate and highly efficient in use.

Other objects will appear hereinafter.

The invention consists in the combinations and arrangements of parts hereinafter described and claimed.

The invention will be best understood by reference to the accompanying drawings forming a part of this specification, and in which Figure 1 is a perspective view of fragmentary parts of an automobile body for illustrating a windshield window equipped for use with the device embodying the invention;

Figure 2 is a plan view of the novel attachment;

Figure 3 is a bottom plan view;

Figure 4 is a section taken on line 4—4 of Figure 2;

Figure 5 is a section taken on line 5—5 of Figure 2; and

Figure 6 is a section taken on line 6—6 of Figure 2.

The embodiment of the invention illustrated in the drawing comprises an elongated semi-cylindrical metal body 10 provided midway of its ends with a slotted opening 11 through which a connector unit 12 of a wiper blade 13 will protrude sufficiently to connect with a wiper arm 14, as shown in Figures 1 and 2. Semi-circular blocks 15 of di-electric heat resisting material are attached to the body 10 at its ends by screws 16 inserted through suitable holes therein, adapted to hold said blocks 15 securely in place.

Mounting blocks 17 having curved outer margins 18 adapted to fit the inner walls of the shield body 10 are diametrically arranged in spaced relation intermediate of the end block 15. Each of the blocks 17 is provided with diametrically located notches 19 having a circular bottom 20. At the bottom of each notch a hole is provided in the block in alignment with a suitable hole in the body 10 through which a suitable rivet 21 is secured as shown. The outer edges of the notch 19 have opposed convergently projecting faces 22 and 23 adapted to suitably engage the metal frame 24 of the conventional wiper blade 13, as shown in Figure 5. By this arrangement the wiper blade 13 is free to rock back and forth as necessary for efficient use.

The blocks 17 are constructed of the same material as the end blocks 15 and are provided with suitable holes 24 in alignment with holes 25, provided in the end blocks 15.

A suitable wire 26 of high resistance is mounted in parallel relation between an inner wall of the body 10 and the wiper blade 13 on each side thereof, and having its terminals 27 and 28 protruding at one of the end blocks 15 where it is to be connected to a suitable source of electrical energy by the usual means.

The body 10 is further provided with a highly polished inner surface adapted to serve as a reflector of the heat waves generated in the wire 26. By this arrangement the body 10 serves as a shield for the blade 13, and the wire when energized radiates heat waves against the blade 13 and its path of travel while in motion.

The arrangement is such that when mounted over a wiper blade in use on an automobile windshield, as shown in Figure 1, the heating element receives a suitable current of electricity. The element becomes heated and reflects the heat against the glass of the windshield and also the wiping element of said blade, thereby applying heat directly for the removal of snow or ice and prevents the blade from adhering.

While I have illustrated and described a suitable arrangement and combinations of parts for carrying the invention into use, I do not wish to be limited by the precise details thereof, but desire to avail myself of such variations and modifications as will fall within the spirit and scope of the appended claims.

I claim:

1. In combination, a reciprocating windshield wiper blade of the squeegee type; a semi-cylindrical metal housing; semi-circular end blocks of di-electric heat resisting material attached to said housing; a plurality of mounting blocks of di-electric heat resisting material secured in spaced relation intermediate said end blocks; a diametrically aligned notch in each of said mounting blocks having a circular bottom with opposed convergingly projecting curved faces arranged and adapted to rockably engage the metal frame of a conventional wiper blade when inserted therein; heating elements arranged longitudinally of said housing adjacent opposite inner walls and carried in suitable openings, in said end blocks and said mounting blocks arranged and adapted to be connected to a suitable source of electrical energy; there being a slotted opening at the top of said housing through which a connector unit of a wiper blade will protrude sufficiently to engage a wiper arm.

2. The construction specified in claim 1 in which the said semi-cylindrical housing is provided with an inner surface for reflecting heat waves.

3. The construction specified in claim 1 in which the mounting blocks are each provided with opposed convergently projecting faces arranged and adapted to rockably hold a wiper blade frame.

VICTOR P. SCHNEIDER.

REFERENCES CITED

The following references are of record in the file of this patent:

UNITED STATES PATENTS

| Number | Name | Date |
| --- | --- | --- |
| 1,640,887 | Davis | Aug. 30, 1927 |
| 2,034,880 | Sackett | Mar. 24, 1936 |
| 2,416,572 | Cordova | Feb. 25, 1947 |